United States Patent
Okada et al.

[11] Patent Number: 5,899,492
[45] Date of Patent: May 4, 1999

[54] AIRBAG INFLATOR

[75] Inventors: Jun Okada, Tokyo; Kiyohiro Uramoto, Yokohama, both of Japan

[73] Assignee: Nissan Motor Co., Ltd., Kanagawa, Japan

[21] Appl. No.: 09/150,341

[22] Filed: Sep. 10, 1998

Related U.S. Application Data

[62] Division of application No. 08/882,341, Jun. 25, 1997.

[30] Foreign Application Priority Data

| Jun. 26, 1996 | [JP] | Japan | 8-165626 |
| May 20, 1997 | [JP] | Japan | 9-129506 |

[51] Int. Cl.⁶ ................................................ B60R 21/26
[52] U.S. Cl. ................................. 280/736; 280/737
[58] Field of Search ........................... 280/736, 737, 280/741, 742

[56] References Cited

U.S. PATENT DOCUMENTS

| 3,822,895 | 7/1974 | Ochiai . |
| 4,878,690 | 11/1989 | Cunningham . |
| 4,890,860 | 1/1990 | Schneiter . |
| 4,923,212 | 5/1990 | Cuevas . |
| 5,158,323 | 10/1992 | Yamamoto et al. . |
| 5,158,328 | 10/1992 | Anderson et al. . |
| 5,348,344 | 9/1994 | Blumenthal et al. ............ 280/737 |
| 5,429,387 | 7/1995 | Clark et al. . |
| 5,518,268 | 5/1996 | Moore et al. . |
| 5,538,278 | 7/1996 | Blackshire et al. . |
| 5,556,439 | 9/1996 | Rink et al. . |
| 5,564,742 | 10/1996 | Clark et al. . |
| 5,566,976 | 10/1996 | Cuevas . |
| 5,582,428 | 12/1996 | Buchanan et al. . |
| 5,590,906 | 1/1997 | Faigle et al. . |
| 5,593,181 | 1/1997 | Walker et al. . |
| 5,630,619 | 5/1997 | Buchanan et al. ............ 280/737 |
| 5,673,933 | 10/1997 | Miller et al. . |
| 5,763,817 | 6/1998 | Renfroe et al. . |
| 5,794,973 | 8/1998 | O'Loughlin et al. ............ 280/737 |

FOREIGN PATENT DOCUMENTS

| 0 685 369 A2 | 12/1995 | European Pat. Off. . |
| 2 270 742 | 3/1994 | United Kingdom . |

*Primary Examiner*—Paul N. Dickson
*Attorney, Agent, or Firm*—McDermott, Will & Emery

[57] ABSTRACT

An airbag inflator comprises a housing having an interior and gas outlet ports communicating with the interior and open to outside the housing. First and second divider walls separate at least two gas chambers from the interior. A pressurized combustible gaseous mixture is stored in each gas chamber. An initiator is disposed within each gas chamber and actuatable to ignite the pressurized combustible gaseous mixture.

29 Claims, 9 Drawing Sheets

AIRBAG INFLATOR

This application is a divisional of application Ser. No. 08/882,341 filed Jun. 25, 1997 currently pending.

BACKGROUND OF THE INVENTION

The present invention relates to an inflator for an inflatable airbag of a vehicle occupant restraint system.

In vehicle occupant restraint systems, an airbag is inflatable by an inflation fluid from an inflation fluid source stored in an airbag inflator upon a collision.

Various types of inflators for vehicle inflatable airbags are well known. Among them, one type of inflators include a housing, a solid gas generant filled in the housing, a heat-producing material enclosed in the gas generant, an ignitor material disposed at one end portion of the housing, and a filter disposed between the housing and the gas generant. A plurality of gas outlet,ports are formed in a circumferential wall of the housing. The solid gas generant is a material thermally decomposable to generate an inflation gas for inflating the airbag. For instance, the solid gas generant is sodium azide thermally decomposable to generate a nitrogen gas as indicated by the following formula:

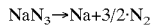

The ignitor material is a pyrotechnic, for example, a powdery mixture of zinc perchlorate and potassium perchlorate, which is adapted to ignite in response to an electrical signal generated upon a vehicle collision. The heat-producing material is, for example, a pyrotechnic including boron potassium nitrate powder. The heat-producing material increases heat generated by the ignition of the ignitor material to thermally decompose the solid gas generant. The filter is provided for cooling the inflation gas resulting from the thermal decomposition of the solid gas generant and for trapping solid products which are generated by the thermal decomposition together with the inflation gas, to prevent the by-products from entering the airbag and a vehicle occupant compartment.

In this type of the inflator, it takes a relatively long period of time from ignition of the ignitor material in response to the electrical signal to generation of the inflation gas from the gas generant. The inflator of such type is required to use a sensor for reducing the relatively long period of time, which influences other components of the inflator. In addition, by the reason of using the ignitor material to cause the thermal decomposition of the gas generant, the conventional type of the inflator has a substantial limitation with respect to the arrangement or layout of components accommodated within the housing. This leads to a limited configuration of the housing.

Meanwhile, there is a demand to provide an airbag inflator adapted to control a timing of discharge of gas from the inflator depending upon various factors such as severity of the vehicle collision, position of the occupant, size of the occupant's body, and the like.

SUMMARY OF THE INVENTION

It is an object of the present invention to provide an airbag inflator having an improved performance.

It is a further object of the present invention to provide an airbag inflator capable of quickly actuating an inflatable airbag in response to occurrence of a vehicle collision.

Another object of the present invention is to provide an airbag inflator capable of being free from such the limited arrangement of the components as the conventional type of the airbag inflator and having a simple structure, serving for saving the space occupied by the airbag inflator in the vehicle and facilitating the manufacturing process.

Still another object of the present invention is to provide an airbag inflator capable of varying a flow rate of gas delivered to an inflatable airbag.

According to one aspect of the present invention, there is provided an airbag inflator, comprising:

a housing having an interior and a gas outlet port communicating with the interior and open to outside the housing;

a first wall separating an inflation gas chamber from the interior;

a pressurized inflation gas stored in the inflation gas chamber;

a second wall separating an initiator gas chamber from the interior;

a pressurized combustible gaseous mixture stored in the initiator gas chamber; and an initiator disposed within the initiator gas chamber and actuatable to ignite the pressurized combustible gaseous mixture;

the second wall being supported by the pressurized combustible gaseous mixture and resiliently deformable to force the first wall to rupture, permitting a flow of the pressurized inflation gas from the housing though the gas outlet port in response to actuation of the initiator.

According to another aspect of the present invention, there is provided an airbag inflator, comprising:

a housing having an interior and a gas outlet port open to outside the housing and communicating with the interior;

divider walls separating at least two chambers from the interior;

pressurized combustible gaseous mixtures stored in said at least two chambers;

initiators each adapted to actuate at individual ignition timings and disposed within the at least two chambers, the initiators being actuatable to ignite the pressurized combustible gaseous mixtures to rupture the divider walls; and an integrally hinged flap portion forcibly separable from each of the divider walls in response to actuation of the initiators;

the integrally hinged flap portion cooperating with the gas outlet port to provide a variety of flow rates of the pressurized combustible gaseous mixture flowing through the gas outlet port out of the housing upon the separation of the integrally hinged flap portion.

DETAILED DESCRIPTION OF THE INVENTION

Referring now to FIGS. 1–8, a first embodiment of an airbag inflator 10 according to the present invention will be explained hereinafter.

Figure 1:
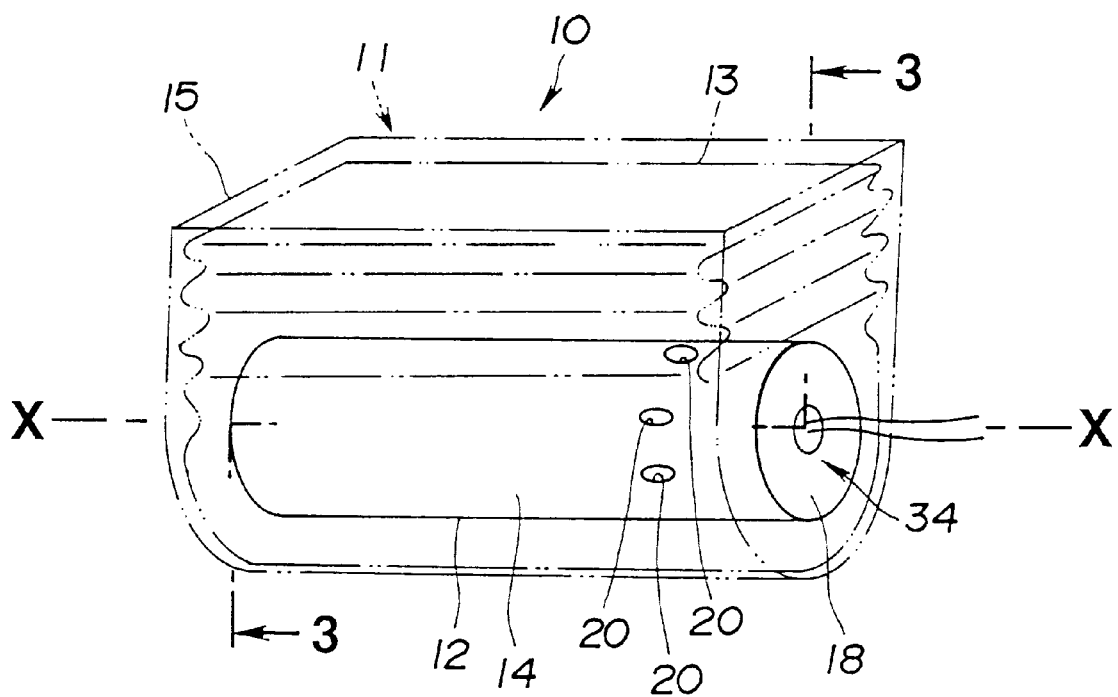
FIG. 1 is a perspective view of a vehicle occupant restraint system into which an airbag inflator of a first embodiment according to the present invention is incorporated.

As illustrated in FIG. 1, the airbag inflator 10 is mounted to an occupant restraint system 11. The airbag inflator 10 is disposed inside an inflatable airbag 13 accommodated in a container 15. The airbag inflator 10 includes a generally cylindrical housing 12 having a center axis X. The housing 12 is adapted to act as a pressure tank and made of a suitable material having a high rigidity. The housing 12 includes a cylindrical side wall 14 and opposed end walls 16 and 18 which are connected with the side wall 14 to close opposite ends of the housing 12. The housing 12 has an interior therein and a gas outlet port 20 which communicates with the interior and is open to outside the housing 12. In this embodiment, the housing 12 has a plurality of gas outlet ports 20. The gas outlet ports 20 are formed in the cylindrical side wall 14 in circumferentially and equi-distantly spaced apart relation to each other, three of which are shown in FIG. 1. The gas outlet ports 20 are not limited to this embodiment in size and arrangement.

A plurality of walls are so disposed within the housing 12 as to divide the interior of the housing 12 into a plurality of chambers. The plurality of chambers include an initiator gas chamber having a pressurized combustible gaseous mixture, an inflation gas chamber having a pressurized inflation gas, and an intermediate chamber disposed between the initiator gas chamber and the inflation gas chamber and directly communicating with the gas outlet ports 20. The intermediate chamber is preferably interposed between the initiator gas chamber and the inflation gas chamber. Each of the plurality of walls is adapted to resiliently deform and rupture in response to application of a pressure of not less than a predetermined value.

Specifically, in this embodiment, a first divider wall 24 and a second pressure-applying wall 26 are disposed within the housing 12 in substantially axially spaced and aligned relation to each other. The walls 24 and 26 divide the interior of the housing 12 into an inflation gas chamber 28, an initiator gas chamber 30 and an intermediate chamber 32 between the chambers 28 and 30. Each of the walls 24 and 26 is secured to an inside surface of the housing 12 in a suitable manner such as welding so that the inflation gas chamber 28 and the initiator gas chamber 30 are hermetically sealed. The gas outlet ports 20 are open into the side wall 14 partly defining the intermediate chamber 32. The divider wall 24 separates the inflation gas chamber 28 from the remainder of the interior of the housing 12. The inflation gas chamber 28 has a volume of not less than 50 cm$^3$. The pressure-applying wall 26 separates the initiator gas chamber 30 from the remainder of the interior of the housing 12. The initiator gas chamber 30 has a volume of not less than 5 cm$^3$. The intermediate chamber 32 between the walls 24 and 26 acts as a delivery passage for delivering flow of the gases discharged from the chambers 28 and 30 via the gas outlet ports 20 to outside the housing 12.

Figure 2:
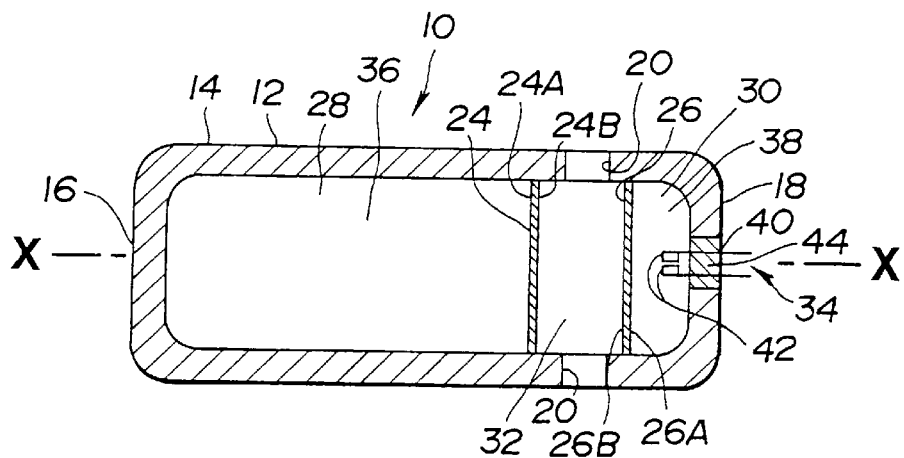
FIG. 2 is a schematic longitudinal section of the airbag inflator of FIG. 1, showing states of resiliently deformable walls before filling gases therein.
Figure 7:
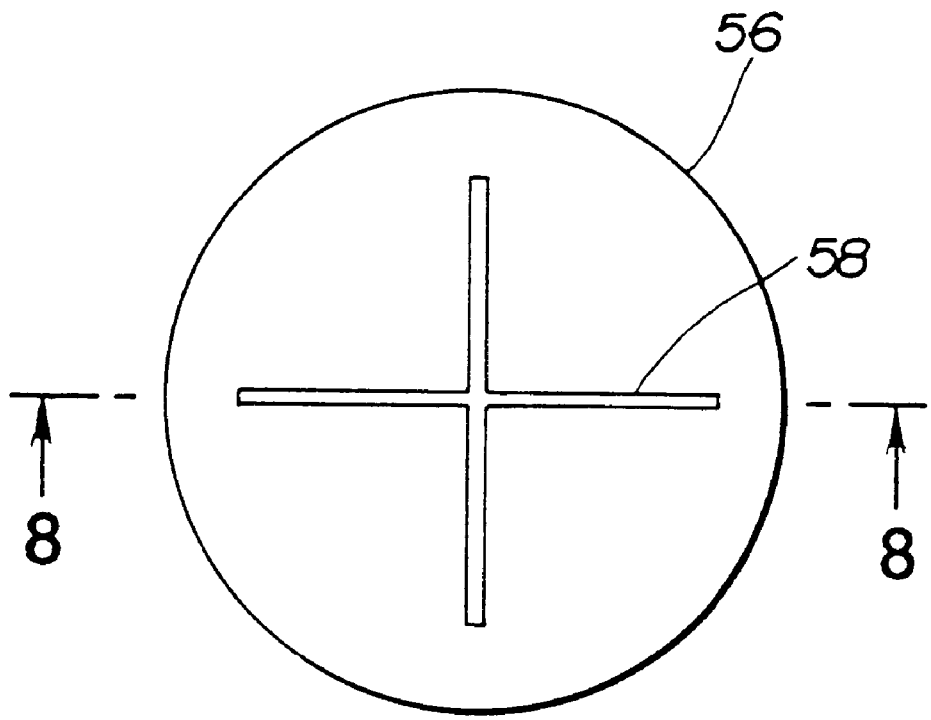
FIG. 7 is an enlarged plan view of a rupturable disk.
Figure 8:
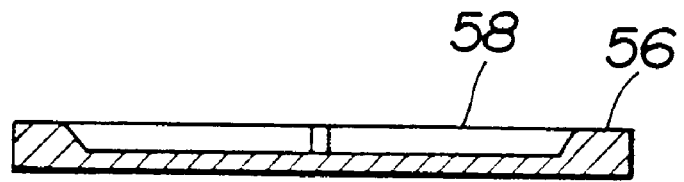
FIG. 8 is a section taken along line 8—8 of FIG. 7.

Each of the divider wall 24 and the pressure-applying wall 26 is so configured as to be resiliently deformable and rupturable when the pressure having not less than a predetermined value is applied thereto. The walls 24 and 26 each may be in the form of a disk 56 formed with a generally cross-shaped fragile portion 58 having a reduced thickness as shown in FIGS. 7 and 8. The fragile portion 58 is disposed at a substantially center of the disk 56. Preferably, the fragile portion 58 has a length which is ½ to 1 time an inner diameter of the housing 12. In the case of using the disks 56, the walls 24 and 26 are rupturable at the fragile portion 58 in response to application of a pressure of not less than the predetermined value. The predetermined pressure value at which the divider wall 24 is rupturable is equal to the predetermined pressure value at which the pressure-applying wall 26 is rupturable, but the former predetermined pressure value may be lower than the latter predetermined pressure value. If a pressure is not applied to each of the divider wall 24 and the pressure-applying wall 26, the walls 24 and 26 are not resiliently deformed and in a generally flat state and substantially parallel to each other as shown in FIG. 2. Thus, the walls 24 and 26 have rupture strength, respectively. The rupture strength of each of the walls 24 and 26 is substantially determined by the following formula: (tensile strength of material)×(thickness)/(outer diameter). The walls 24 and 26 are made of a suitable material having anti corrosion and less-deterioration, for instance, stainless steel, aluminum, or the like. The rupturable walls are not limited to this embodiment and may be modified in configuration. Further, the rupturable walls may be modified in number and arrangement within the housing 12 and in rupture strength, depending on specific characteristics of desired occupant restraint systems.

Filled in the inflation gas chamber 28 is a pressurized inflation gas 36 inflating an airbag for protecting an occupant of the vehicle upon a vehicle collision. The inflation gas 36 has a pressure in a range of 50 atm to 300 atm. The pressurized inflation gas 36 may be one of gases such as an inert gas, a mixture of an inert gas, a combustible gas and an oxygen gas, and a mixture of an inert gas and a combustible gas. The inert gas may be at least one selected from the group consisting of nitrogen, argon, and helium. The combustible gas in the inflation gas 36 may be at least one selected from the group consisting of hydrogen and hydrocarbon.

Filled in the initiator gas chamber 30 is a pressurized combustible gaseous mixture 38. The combustible gaseous mixture 38 has a pressure in a range of 10 atm to 150 atm. The pressurized combustible gaseous mixture 38 comprises a combustible gas, an oxygen gas, and the inert gas The combustible gas in the mixture 38 may be at least one selected from the group consisting of hydrogen and hydrocarbon.

The pressure-applying wall 26 has on one side thereof a pressure support surface 26A on which the pressure of the pressurized combustible gaseous mixture 38 is exerted. Thus, the pressure-applying wall 26 is supported by the pressurized combustible gaseous mixture 38. The divider wall 24 has on one side thereof a pressure support surface 24A on which the pressure of the pressurized inflation gas 36 is exerted. Thus, the divider wall 24 is supported by the pressurized inflation gas 36.

FIG. 2 shows generally flat conditions of the walls 24 and 26 before the pressurized inflation gas 36 and the pressurized combustible gaseous mixture 38 are filled in the chambers 28 and 30, respectively.

Figure 3:
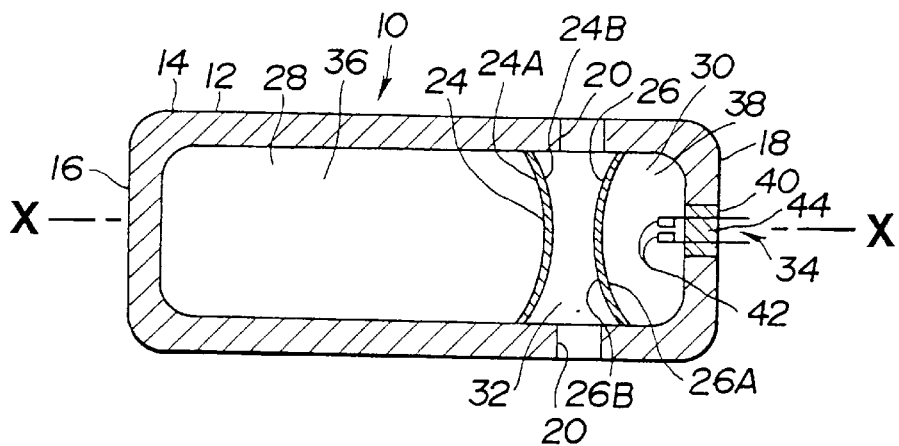
FIG. 3 is a schematic longitudinal section taken along line 3—3 of FIG. 1, showing states of the walls after filling the gases therein.

FIG. 3 shows deformed states of the divider wall 24 and the pressure-applying wall 26 after the pressurized inflation gas 36 and the pressurized combustible gaseous mixture 38 are filled in the chambers 28 and 30, respectively. In this state, the divider wall 24 is resiliently deformed to swell or expand toward the pressure-applying wall 26 by the pressure of the pressurized inflation gas 36 in the inflation gas chamber 28. Similarly, the pressure-applying wall 26 is resiliently deformed to expand toward the divider wall 24 by the pressure of the pressurized combustible gaseous mixture 38 in the initiator gas chamber 30.

Generally, it is desirable for the purpose of quick inflation of the vehicle airbag that the pressure applied to a pressure-responsive rupturable wall rapidly increases up to a value required for the rupture thereof. Combustion velocity of combustible gas is expressed by the formula indicated below.

$$S_L = A \cdot T^m \cdot P^{-n}$$

where $S_L$ is combustion velocity, T is gas temperature, P is pressure, and A, m, and n are constants.

As will be appreciated from the above-indicated formula, a relatively low pressure, i.e. 10–150 atm, of the combustible gas is desirable for increasing combustion velocity, namely, for rapid combustion. For this purpose, in this embodiment, the pressure of the combustible gaseous mixture 38 in the initiator gas chamber 30 is relatively low. Further, the pressurized combustible gaseous mixture 38 is lesser in pressure than the pressurized inflation gas 36 in the chamber 28.

In addition, the pressure of each of the combustible gaseous mixture 38 in the chamber 30 and the inflation gas 36 in the chamber 28 can be determined depending on a specific characteristic of a desired airbag inflator. For instance, in the case of an airbag having a relatively great volumetric capacity, such as an airbag of an assistant driver's side occupant restraint system, the pressure of each of the gases is set relatively high. On the other hand, in the case of an airbag having a smaller volumetric capacity, such as an airbag of an occupant restraint system for a vehicle side-collision, the pressure of each of the gases is set relatively low.

The walls 24 and 26 are arranged such that the pressure-applying wall 26 is forcibly contacted with the divider wall 24 and ruptures the divider wall 24 in response to actuation of an initiator 34 which is mounted to the initiator gas chamber 30 as explained later. The pressure-applying wall 26 is resiliently deformed as the pressure applied thereto increases, forcing the divider wall 24 to rupture and at substantially the same time the wall 26 per se ruptures. Namely, the distance between the spaced walls 24 and 26 is determined such that the wall 26 is forced to contact and rupture the wall 24 by further expansion of the wall 26 which is caused by the increased pressure in the initiator gas chamber 30 upon actuation of the initiator 34. Preferably, the distance between the walls 24 and 26 is 0.1 to 0.4 of an outer diameter of the pressure-applying wall 26.

The initiator 34 is disposed within the initiator gas chamber 30 and actuatable to ignite the pressurized combustible gaseous mixture 38 in the chamber 30. In this embodiment, the initiator 34 is fixed to the end wall 18 of the housing 12. The initiator 34 includes a spark ignitor 40 having spark discharge electrodes 42, an insulator 44 such as hermetic glass seal, polytetrafluoroethylene, epoxy resin or the like. The initiator 34 is connected through lead wires (not shown) to a controller (not shown) which produces electrical signals upon detecting a vehicle collision. Thus, the initiator 34 is adapted to actuate by the electrical signals to ignite the pressurized combustible gaseous mixture 38 in the initiator gas chamber 30. The ignition causes a rise in temperature of the pressurized combustible gaseous mixture 38 and a rapid increase in pressure thereof to the predetermined value.

Figure 6:
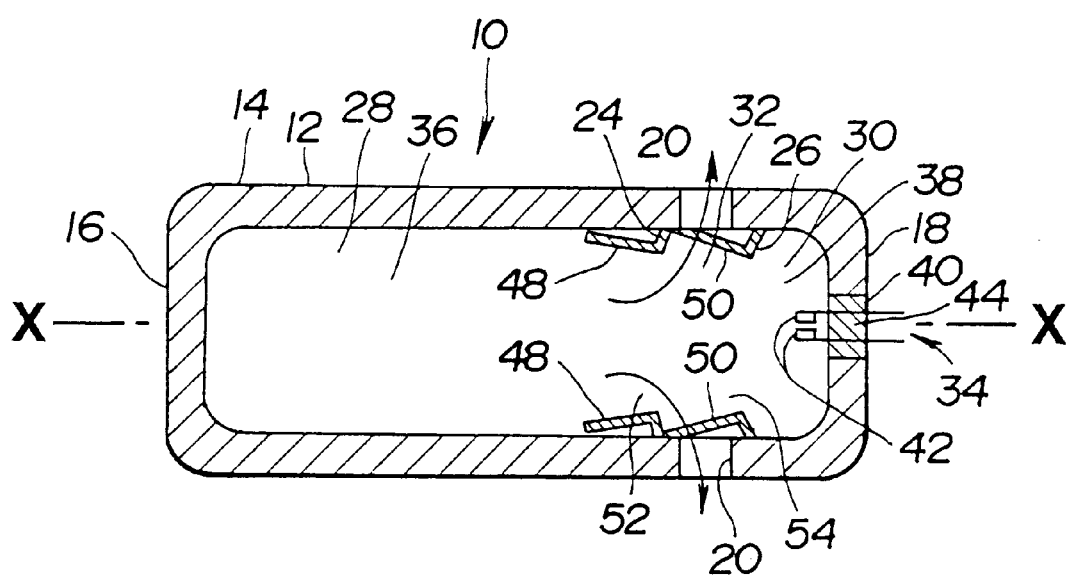

The pressure-applying wall 26 has a pressure apply surface 26B on the side opposite to the pressure support surface 26A. When the pressure in the initiator gas chamber 30 is increased by ignition of the pressurized combustible gaseous mixture 38 upon actuation of the initiator 34, the pressure apply surface 26B is forced to contact an outer surface 24B of the divider wall 24 which is on the side opposite to the pressure support surface 24A. By the contact between the pressure support surface 26B and the outer surface 24B, the increased pressure in the initiator gas chamber 30 is transmitted to the divider wall 24. Then, the divider wall 24 is brought into a swelled state projecting in substantially the same direction, i.e. toward the end wall 16 of the housing 12, as well as the pressure-applying wall 26. When the increased pressure reaches the predetermined value, the divider wall 24 and the pressure-applying wall 26 rupture almost simultaneously in substantially the same direction. This causes separation of respective integrally hinged flap portions 48 and 50 from the walls 24 and 26, as shown in FIG. 6. The flap portions 48 define an aperture 52 permitting the pressurized inflation gas 36 to flow out of the inflation gas chamber 28 into the intermediate chamber 32. The flap portions 50 define an aperture 54 permitting combustion gaseous products resulting from combustion reaction of the pressurized combustible gaseous mixture 38 and the remainder of the pressurized combustible gaseous mixture 38 to flow from the initiator gas chamber 30 into the intermediate chamber 32. The flap portions 50 of the wall 26 also cover at least a part of the gas outlet ports 20, blocking a portion of the gas flowing through the chamber 32 acting as delivery passage into the gas outlet ports 20. The gases flow from the housing 12 through the gas outlet ports 20 without being covered with the flap portions 50, into the inflatable airbag 13 shown in FIG. 1, and inflate the airbag 13. Thus, the flap portions 50 cooperate with the gas outlet ports 20 to provide a variety of flow rates of the gases flowing through the gas outlet ports 20 from the housing 12. In the case of using the disk 56 shown in FIGS. 7 and 8 as the wall 26, the covering for the gas outlet ports 20 is adjustable by changing the position of the gas outlet ports 20 and the lengths of four arms of the cross-shaped fragile portion 58 which extend radially outward from the intersection. Preferably, a center of each gas outlet port 20 is disposed spaced apart by a distance of not more than ½ of an outer diameter of the wall 26 from the outer periphery of the wall 26 at which the wall 26 is connected with the housing 12.

Referring to FIGS. 3–6, operation of the airbag inflator will be explained hereinafter.

Figure 4:
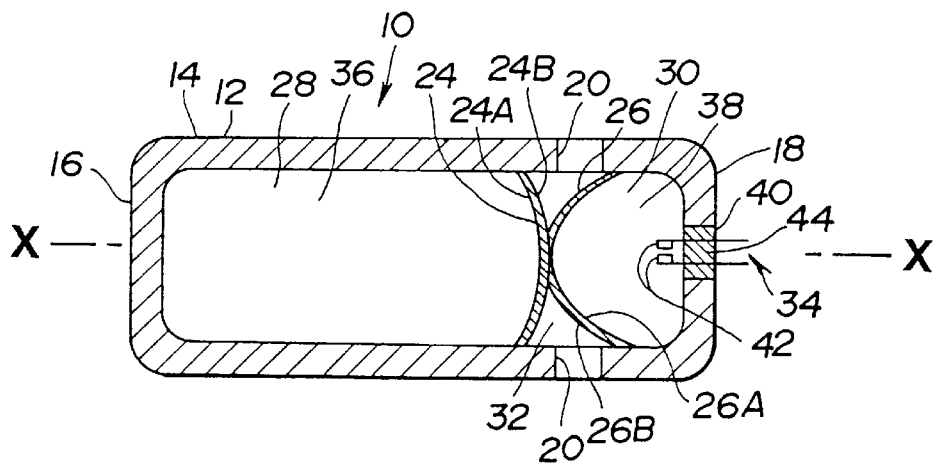
FIGS. 4 to 6 are sections similar to FIG. 3, but showing states of the walls following the state shown in FIG. 3.
Figure 5:
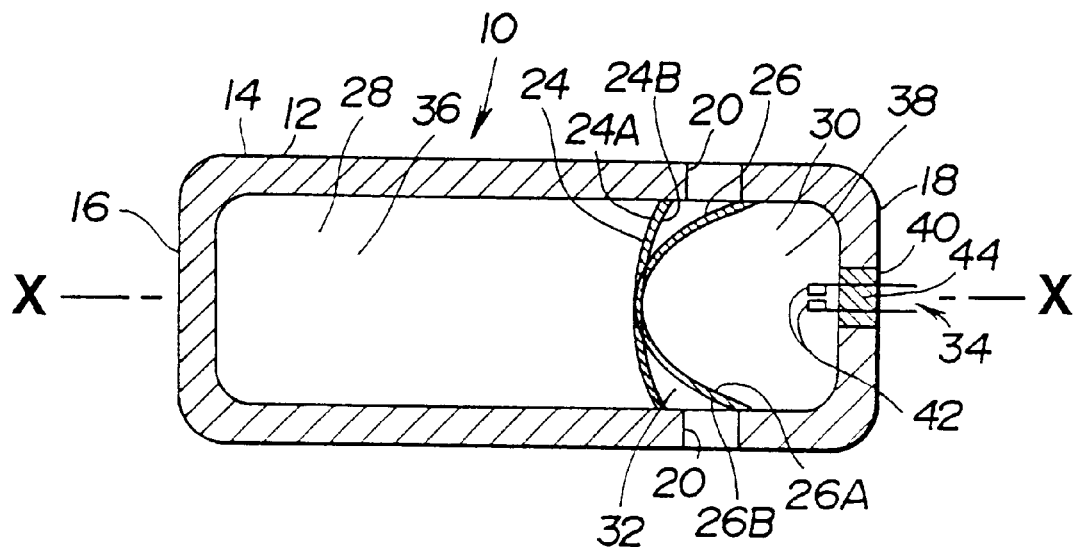

When the initiator 34 is operated by the electrical signals transmitted from the controller and ignites the pressurized combustible gaseous mixture 38 in the initiator gas chamber 30, the pressure-applying wall 26 is subject to the increased pressure in the initiator gas chamber 30 so that the pressure-applying wall 26 is deformed and changed from the condition shown in FIG. 3 to a ruptured condition shown in FIG. 6 via conditions shown in FIGS. 4 and 5. In the condition of FIG. 4, the pressure-applying wall 26 is further expanded in such a manner that its central portion projects toward a central portion of the divider wall 24 and the pressure apply surface 26B is contacted with the outer surface 24B.

In the condition shown in FIG. 5, the pressure-applying wall 26 forces the divider wall 24 toward the end wall 16 and brings the divider wall 24 into the swelled state projecting toward the end wall 16 as well as the state of the pressure-applying wall 26. The increased pressure is transmitted from the pressure-applying wall 26 to the divider wall 24 via the contact portion. The swelled state of the divider wall 24 is contrary to the deformed state shown in FIG. 4.

Subsequently, in the condition shown in FIG. 6, the divider wall 24 and the pressure-applying wall 26 are ruptured substantially simultaneously to permit the pressurized inflation gas 36 together with the combustion gaseous products and the remainder of the pressurized combustible gaseous mixture 38 to flow out of the housing 12 via the apertures 52 and 54 and the gas outlet ports 20.

Figure 9:
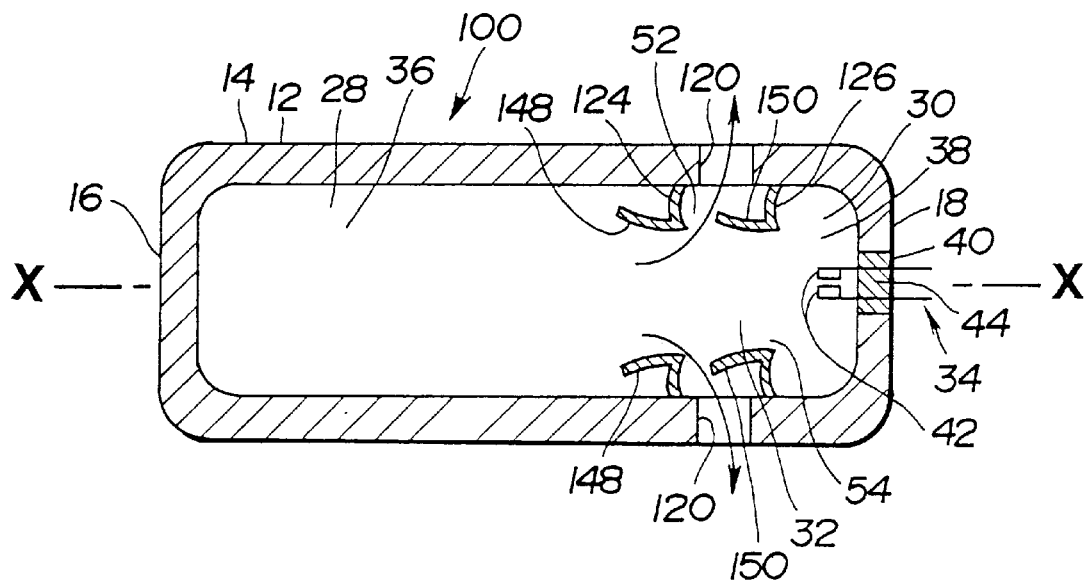
FIG. 9 is a schematic longitudinal section of a second embodiment of the airbag inflator.
Figure 10:
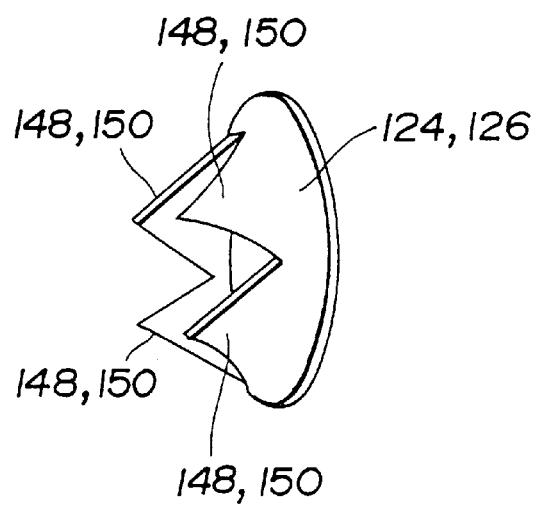
FIG. 10 shows a ruptured state of the rupturable disk.

Referring to FIGS. 9 and 10, a second embodiment of the airbag inflator 100 according to the present invention is now explained. The airbag inflator 100 is similar to the airbag inflator 10 of the above-described first embodiment except configuration and arrangement of a divider wall 124 and a pressure-applying wall 126 and gas outlet ports 120. Like reference numerals denote like parts and therefore detailed explanations therefor are omitted.

The walls 124 and 126 are in the form of a resiliently deformable and rupturable disk 156 having a fragile portion different from the fragile portion 58 of the first embodiment in such configuration that as to define integrally hinged flap portions 148 and 150 which fail to cover the gas outlet ports 120 upon separation from the walls 124 and 126. For instance, by adjusting lengths of four arms of the cross-shaped thinned portion which extend radially outwardly from the intersection, the flap portions 148 and 150 may fail to cover the gas outlet ports 120. The gas outlet ports 120 also are so arranged as to fail to be covered with the integrally hinged flap portions 148 and 150 upon separation thereof from the walls 124 and 126.

Referring now to FIGS. 13 to 16, a third embodiment of an airbag inflator 200 according to the present invention is explained. The airbag inflator 200 differs in the provision of at least two chambers each having pressurized combustible gaseous mixtures and initiators which are adapted to actuate at individual ignition timings, from the airbag inflator 10 of the above-described first embodiment, and therefore like reference numerals denote like parts and detailed explanations therefor are omitted.

Figure 13:
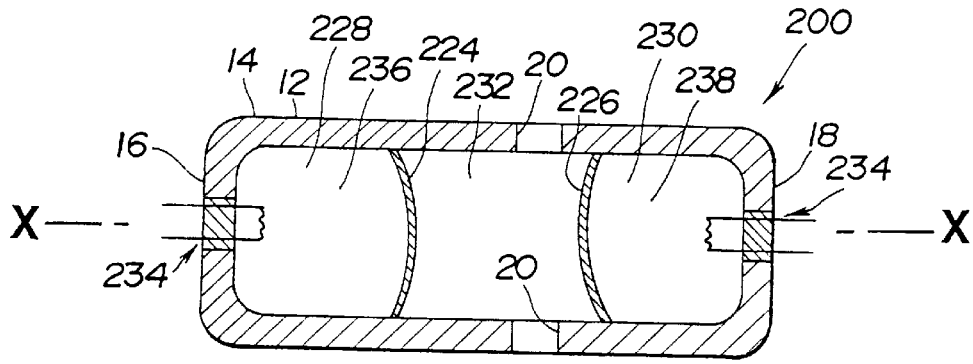
FIG. 13 is a longitudinal section of a third embodiment of the airbag inflator, showing resiliently deformable walls.

As illustrated in FIG. 13, the airbag inflator 200 has divider walls 224 and 226 separating a pair of chambers 228 and 230 from the interior of the housing 12. The chambers 228 and 230 are disposed at opposite ends of the housing 12 and a chamber 232 formed with the gas outlet port 20 is interposed between the chambers 228 and 230. A pressurized combustible gaseous mixture 238 is filled in each of the chambers 228 and 230. The pressurized combustible gaseous mixture 238 comprises a combustible gas, an oxygen gas and an inert gas. Specifically, the pressurized combustible gaseous mixture 238 consists of essentially of 15–40% by volume of hydrogen, 12–18% by volume of oxygen and a balance of an inert gas. The inert gas is at least one selected from the group consisting of nitrogen, argon and helium. Initiators 234 are disposed within the chambers 228 and 230 and adapted to actuate at individual ignition timings to ignite the pressurized combustible gaseous mixtures 238 in response to electrical signals indicating occurrence of the vehicle collision. The initiators 234 are identical to each other and include nichrome wires electrically heatable. Each of the divider walls 224 and 226 is so configured as to be resiliently deformable and rupturable in response to application of a pressure of not less than a predetermined value, as well as the pressure-applying wall 26 of the first embodiment. The gas outlet ports 20 and the divider wall 226 are configured and arranged such that the integrally hinged flap portions 50 cooperate with the gas outlet ports 20 to provide a variety of flow rates of the pressurized combustible gaseous mixture 238 flowing through the gas outlet ports 20 from the housing 12 upon the separation of the flap portions 50. Namely, when separated from the divider wall 226 in response to actuation of the initiator 234 in the chamber 230, the flap portions 50 cover a part of the gas outlet ports 20 and block a portion of the gas flow directed to the gas outlet ports 20. For instance, a center of each gas outlet port may be disposed axially spaced apart by a distance of not more than ½ of an outer diameter of the divider wall 226 from the outer periphery of the wall 226 at which the wall 226 is connected with the housing 12. The flap portions 50 have various positions depending on the ignition timings of the initiators 234 in the chambers 228 and 230. The various positions of the flap portions 50 include a maximum open position, a minimum open position and an intermediate open position as illustrated in FIGS. 14 to 16.

Figure 14:
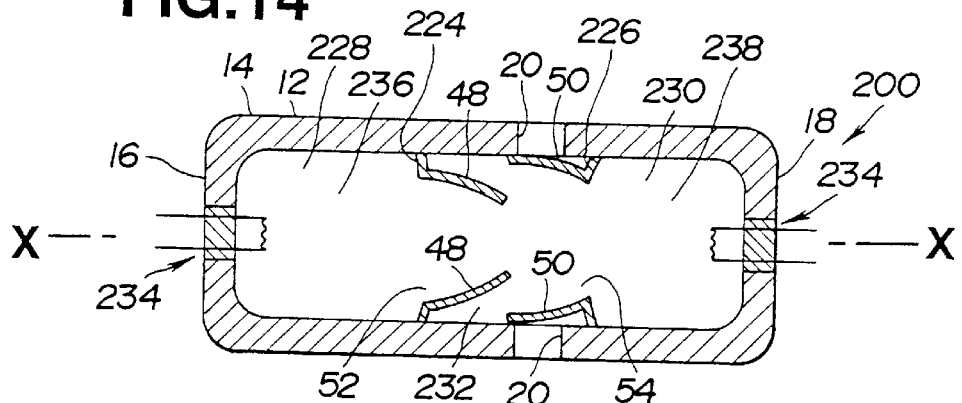
FIGS. 14 to 16 are sections similar to FIG. 13, but illustrating different states of the walls from each other.

FIG. 14 shows the maximum open position of the flap portions 50 of the divider wall 226 in a case where the initiator 234 in the chamber 230 is conditioned to have an advanced ignition timing as compared with the ignition timing of the initiator 234 in the chamber 228. Thus, when the initiator 234 in the chamber 230 has actuated earlier than the initiator 234 in the chamber 228, the flap portions 50 are in the maximum open position in which a minimum flow rate of the pressurized combustible gaseous mixture 238 is permitted.

Figure 15:
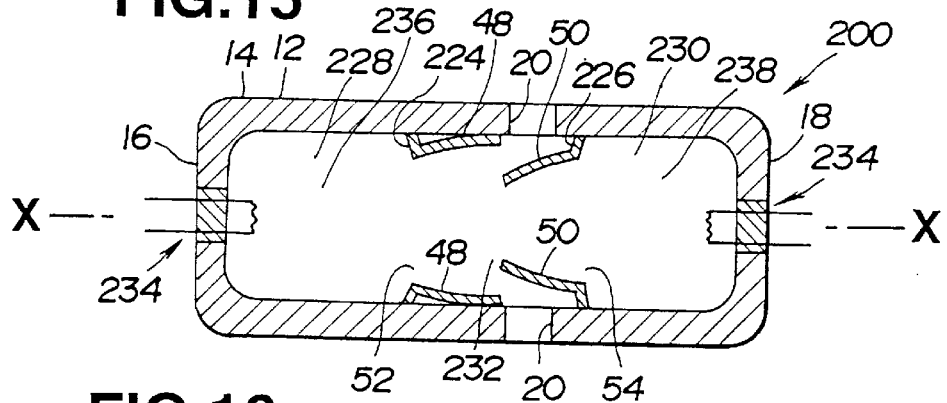

FIG. 15 shows the minimum open position of the flap portions 50 in a case where the initiator 234 in the chamber 230 is conditioned to have a delayed ignition timing as compared with the ignition timing of the initiator 234 in the chamber 228. Namely, when the initiator 234 in the chamber 230 has actuated later than the initiator 234 in the chamber 228, the flap portions 50 are in the minimum open position in which an increased flow rate of the pressurized combustible gaseous mixture 238, greater than the minimum flow rate, is permitted.

Figure 16:
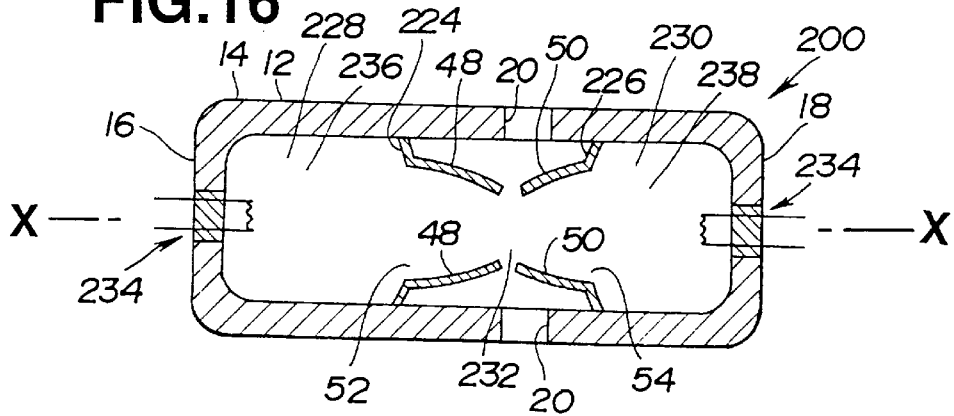

FIG. 16 shows the intermediate open position of the flap portions 50 in a case where the initiator 234 in the chamber 230 is conditioned to have an ignition timing substantially simultaneous with the ignition timing of the initiator 234 in the chamber 228. Namely, when the initiator 234 in the chamber 230 and the initiator 234 in the chamber 228 have actuated at substantially the same time, the flap portions 50 are in the intermediate open position in which a medium flow rate of the pressurized combustible gaseous mixture 238, smaller than the increased flow rate and greater than the minimum flow rate, is permitted.

EXAMPLES

The present invention is described in more detail by way of examples by referring to the accompanying drawings.

However, these examples are only illustrative and not intended to limit a scope of the present invention.

Example 1

An airbag inflator (a) of the first embodiment was prepared according to the following procedures. A pipe made of high-tensile steel and having opposed closed ends and an inner diameter of 50 mm, was used as housing 12. A rupturable disk having a fragile portion easy to rupture was used as each of the divider wall 24 and the pressure-applying wall 26. The rupturable disk was so designed as to be rupturable to define integrally hinged flap portions separated therefrom in response to application of a pressure of not less than 400 atm. Each of the rupturable disks was welded at its outer periphery to the inside surface of the cylindrical side wall of the pipe to define two chambers used as the inflation gas chamber 28 and the initiation gas chamber 30. A distance between the rupturable disks was 15 mm. Eight gas outlet ports were circumferentially equidistantly formed in the cylindrical side wall between the rupturable disks and arranged such that four thereof were covered with the flap portions of the disks ruptured. The chamber used as the inflation gas chamber 28 had a volume of 450 cm$^3$. Gas used as the inflation gas 36 consisted of a nitrogen gas and was filled in the chamber used as the inflation gas chamber 28 at a pressure of 200 atm. The chamber used as the initiator gas chamber 30 had a volume of 50 cm$^3$. Gas used as the combustible gaseous mixture 38 consisted of 60% by volume of hydrogen, 30% by volume of oxygen, and 10% by volume of nitrogen and was filled in the chamber used as the initiator gas chamber 30 at a pressure of 50 atm. A spark ignitor having spark discharge electrodes was fabricated as explained above and used as the initiator 34.

The airbag inflator (a) produced by the above-described procedures was tested in the following manner.

Figure 11:
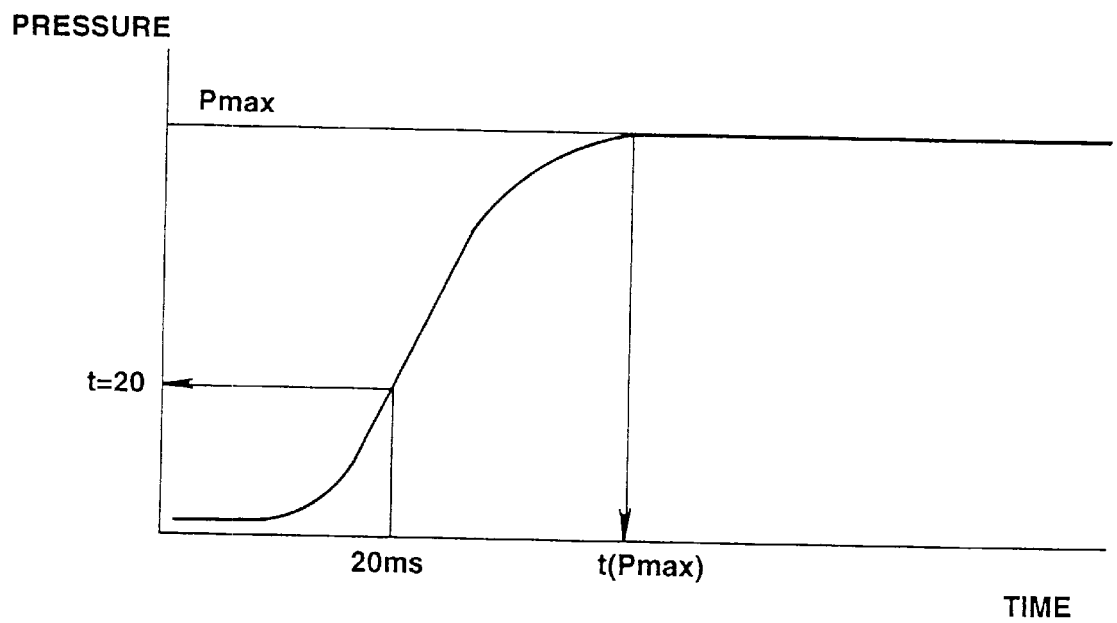
FIG. 11 is a diagram showing a characteristic curve of the airbag inflator.

First, the airbag inflator (a) was disposed within a pressure container having a volumetric capacity of 60 liters and operated in the pressure container. Change of pressure in the pressure container which was caused by discharge of the gases from the airbag inflator, was monitored and estimated by using as indices an elapsed time t(Pmax) (millisecond) required for reaching the maximum pressure Pmax and a pressure P(t=20) generated when 20 milliseconds elapsed, as shown in FIG. 11.

Next, airbags having a volumetric capacity in a range of 10 to 140 liters were mounted to the airbag inflator (a) and monitored with respect to inflation condition thereof.

Example 2

An airbag inflator (b) of the first embodiment was produced in the same manner as described in Example 1 except that a volume of the inflation gas chamber 28 was 400 cm$^3$ and a volume of the initiator gas chamber 30 was 100 cm$^3$. The thus-produced airbag inflator (b) was tested in the same manner as described in Example 1.

Example 3

An airbag inflator (c) of the first embodiment was produced in the same manner as described in Example 1 except that the combustible gaseous mixture 38 in the initiator gas chamber 30 had a pressure of 25 atm, the inflation gas 36 in the inflation gas chamber 28 had a pressure of 150 atm, and the rupturable disk 56 used as the divider wall 24 was configured to be rupturable in response to application of a pressure of not less than 200 atm. The thus-produced airbag inflator (c) was tested in the same manner as described in Example 1.

Example 4

An airbag inflator (d) of the first embodiment was produced in the same manner as described in Example 1 except that the combustible gaseous mixture 38 in the initiator gas chamber 30 had a pressure of 100 atm. The thus-produced airbag inflator (d) was tested in the same manner as described in Example 1.

Example 5

An airbag inflator (e) of the first embodiment was produced in the same manner as described in Example 1 except that the combustible gaseous mixture 38 in the initiator gas chamber 30 consisted of 10% by volume of methane, 40% by volume of hydrogen, 40% by volume of oxygen and 10% by volume of nitrogen. The thus-produced airbag inflator (e) was tested in the same manner as described in Example 1.

Example 6

An airbag inflator (f) of the first embodiment was produced in the same manner as described in Example 1 except that the initiator 34 included a pyrotechnic electrically ignitable. The thus-produced airbag inflator (f) was tested in the same manner as described in Example 1.

Example 7

An airbag inflator (g) of the first embodiment was produced in the same manner as described in Example 1 except that the initiator 34 included nichrome wire having a diameter of 35 micron. The thus-produced airbag inflator (g) was tested in the same manner as described in Example 1.

Example 8

An airbag inflator (h) of the first embodiment was produced in the same manner as described in Example 1 except that the inflation gas 36 in the inflation gas chamber 28 had a pressure of 50 atm and a volume of the inflation gas chamber 28 was 100 cm$^3$. The thus-produced airbag inflator (h) was tested in the same manner as described in Example 1.

Comparative Example 1

An airbag inflator (i) of the conventional type provided for an assistant driver's side airbag of 140-liter volumetric capacity was used. The airbag inflator (i) comprised a housing, a solid gas generant, an ignitor adapted to ignite in response to an electrical signal, and a heat-producing material. The gas generant was a sodium azide-based material. The ignitor was a powdery mixture of zinc perchlorate and potassium perchlorate. The heat-producing material was boron potassium nitrate powder. The gas generant was thermally decomposable and generate gas in response to ignition of the ignitor and then the heat-producing material. The airbag inflator (i) was tested in the same manner as described in Example 1.

Comparative Example 2

An airbag inflator (j) of the second embodiment was produced in the same manner as described in Example 2 except that the combustible gaseous mixture 38 in the initiator gas chamber 30 had a pressure of 5 atm. The thus-produced airbag inflator (j) was tested in the same manner as described in Example 1.

Comparative Example 3

An airbag inflator (k) of the first embodiment was produced in the same manner as described in Example 1 except that a volume of the initiator gas chamber 30 was 4 cm³. The thus-produced airbag inflator (k) was tested in the same manner as described in Example 1.

Comparative Example 4

An airbag inflator (l) of the first embodiment was produced in the same manner as described in Example 1 except that the inflation gas 36 in the inflation gas chamber 28 had a pressure of 350 atm. The thus-produced airbag inflator (l) was tested in the same manner as described in Example 1.

Comparative Example 5

An airbag inflator (m) of the first embodiment was produced in the same manner as described in Example 1 except that a distance between the rupturable disks 56 used as the divider wall 24 and the pressure-applying wall 26 was 20 mm. The thus-produced airbag inflator (m) was tested in the same manner as described in Example 1.

Figure 12:
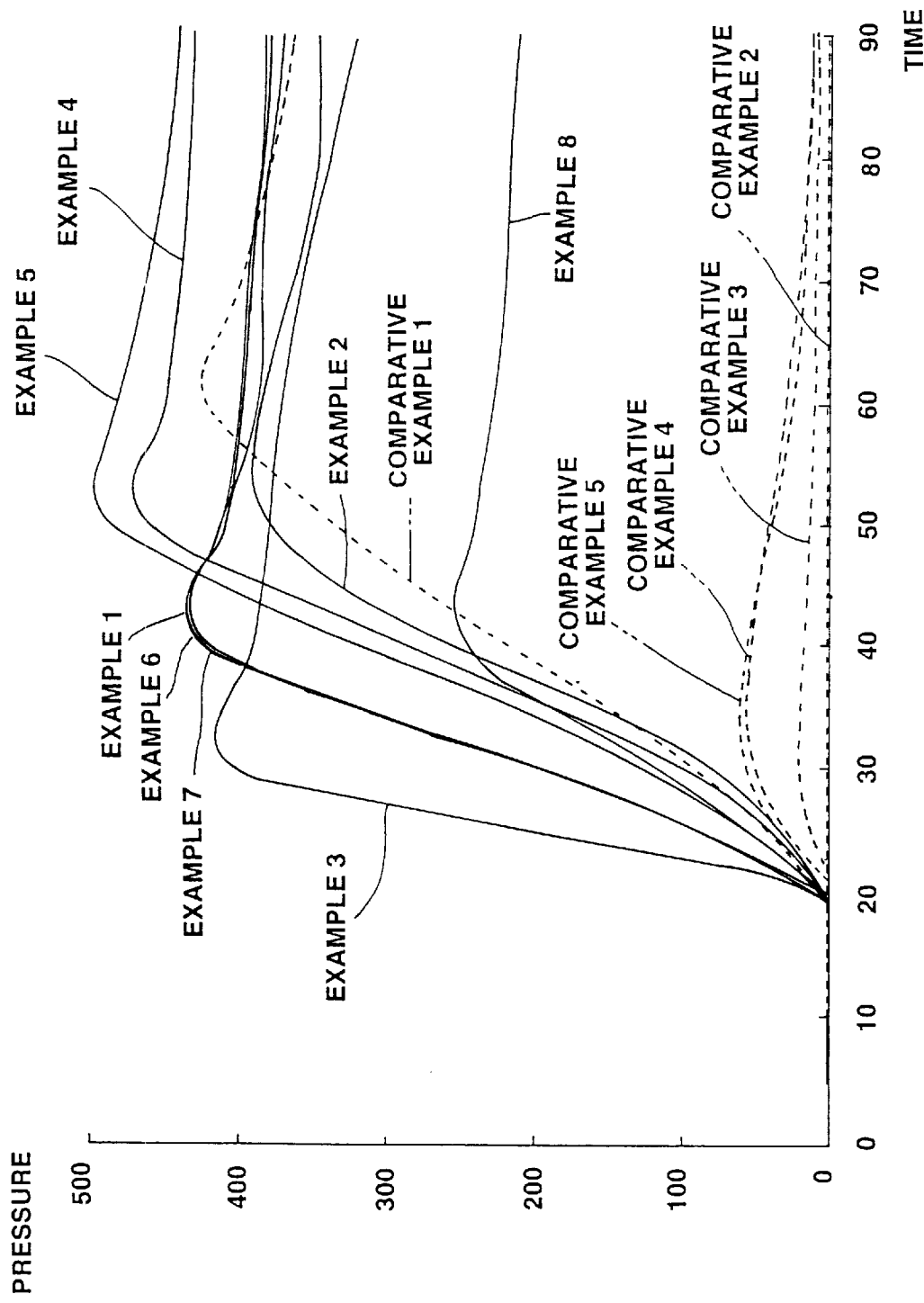
FIG. 12 is a diagram showing relationships between time elapsed and pressure generated after ignition in experiments to the airbag inflators (a)–(m) obtained in Examples 1–8 and Comparative Examples 1–5.

The test results of Examples 1 to 8 and Comparative Examples 1 to 5 are shown in FIG. 12 and Table below.

In FIG. 12, there is shown a relationship (characteristic curve) between generated pressure and elapsed time upon actuation of the initiator of each of the airbag inflators (a) to (m) obtained in Examples 1 to 8 and Comparative Examples 1 to 5. The airbag inflators (a) to (h) of Examples 1 to 8 which comprised the initiator gas chamber having the pressurized combustible gaseous mixture and the inflation gas chamber having the pressurized inflation gas, exhibited pressure change characteristic curves similar to the curve of the conventional type airbag inflator (i) of Comparative Example 1. It was found that in the airbag inflators (c) and (d) of Example 3 and 4, pressure rise was easily adjustable by varying pressure of the gases filled in the initiator gas chamber and/or the inflation gas chamber without largely modifying the structure of the airbag inflator. Further, as seen from the characteristic curve of the airbag inflator (h) of Example (8), it was found that in the case of being used for an inflatable airbag having a reduced volumetric capacity depending on an airbag installation portion of the vehicle, the airbag inflator was applicable by varying the volume and pressure of the inflation gas chamber. In addition, as seen from the characteristic curves of the airbag inflators (f) and (g) of Examples (6) and (7), generation of pressure was not influenced by kinds of initiators. The airbag inflator (e) of Example (5) exhibited a delayed generation of pressure which was caused because of a lower combustion rate of methane gas in the combustible gaseous mixture filled in the initiator gas chamber as compared with hydrogen gas. It was confirmed that kinds of components of the combustible gaseous mixture were suitably selectable depending on the vehicular airbag-installation portion.

In the Table, the symbol ○ indicates a good inflation condition and the symbol X indicates an inferior and undesirable inflation condition. As will be seen from the Table, the airbag inflators (a) to (h) of Examples 1 to 8 exhibited a good inflation condition as compared with those (i) to (m) of Comparative Examples 1 to 5.

TABLE

|  | P(t = 20) kgf/cm³ | t(Pmax) msec. | Inflation Test 10-liter Airbag | Inflation Test 140-liter Airbag |
|---|---|---|---|---|
| Example 1 Inflator (a) | 3.2 | 40 | — | ○ |
| Example 2 Inflator (b) | 2.0 | 50 | — | ○ |
| Example 3 Inflator (c) | 4.2 | 28 | — | ○ |
| Example 4 Inflator (d) | 1.8 | 55 | — | ○ |
| Example 5 Inflator (e) | 1.7 | 52 | — | ○ |
| Example 6 Inflator (f) | 3.0 | 41 | — | ○ |
| Example 7 Inflator (g) | 3.3 | 40 | — | ○ |
| Example 8 Inflator (h) | 3.5 | 42 | ○ | X |
| Comparative Example 1 Inflator (i) | 3.5 | 60 | — | ○ |
| Comparative Example 2 Inflator (j) | 0.5 | 10 | X | — |
| Comparative Example 3 Inflator (k) | 0.1 | 10 | X | — |
| Comparative Example 4 Inflator (l) | 3.0 | 25 | X | — |
| Comparative Example 5 Inflator (m) | 2.8 | 24 | X | — |

Example 9

An airbag inflator (n) of the third embodiment was prepared according to the following procedures. A pipe made of high-tensile steel and having opposed closed ends and an inner diameter of 50 mm, was used as the housing 12. A rupturable disk having a fragile portion reduced in thickness was used as each of the divider walls 224 and 226. The rupturable disk was so configured as to be rupturable to define integrally hinged flap portions separated therefrom in response to application of a pressure of not less than 400 atm. Each of the rupturable disks was welded at its outer periphery to the inside surface of the cylindrical side wall of the pipe to define two opposed chambers used as the chambers 228 and 230. A distance between the rupturable disks was 60 mm. Eight gas outlet ports each having a diameter of 10 mm were formed circumferentially equidistantly in the cylindrical side wall of the pipe. The gas outlet ports were spaced apart in the axial direction of the pipe by 15 mm from the outer periphery of one of the rupturable disks such that, upon rupture of the one of the rupturable disks, the integrally hinged flap portions thereof covered a part of the gas outlet ports. For instance, in the case as shown in FIG. 14, the one of the rupturable disks and the integrally hinged flap portions are denoted as 226 and 50, respectively. The two chambers used as the chambers 228 and 230 each had a volume of 200 cm³. Gas used as the combustible gaseous mixture 238 consisted of 30% by volume of hydrogen, 15% by volume of oxygen and 55% by volume of nitrogen and was filled in each of the two chambers at a pressure of 100 atm. A nichrome wire welded to a pair of electrodes was used as the initiator 234. The initiator within the chamber used as the chamber 230 was so designed as to actuate at earlier ignition timing by 5 milliseconds than the initiator within the chamber used as the chamber 228.

The airbag inflator (n) produced by the above-described procedures was tested in the same manner using the pressure container as described in Example 1.

Example 10

An airbag inflator (o) of the third embodiment was produced in the same manner as described in Example 9 except that the initiator within the chamber used as the chamber 228 was so designed as to actuate at earlier ignition timing by 5 milliseconds than the initiator within the chamber used as the chamber 230. The thus-produced airbag inflator (o) was tested in the same manner as described in Example 9.

Example 11

An airbag inflator (p) of the third embodiment was produced in the same manner as described in Example 9 except that the initiators respectively disposed within the chambers used as the chambers 228 and 230 were so designed as to actuate at substantially the same ignition timing. The thus-produced airbag inflator (p) was tested in the same manner as described in Example 9.

Comparative Example 6

An airbag inflator (q) of the conventional type provided for a driver's side airbag of 45-liter volumetric capacity was used. The airbag inflator (q) comprised a sodium azide-based gas generant and a pyrotechnic ignitor electrically ignitable to cause thermal decomposition of the gas generant. The airbag inflator (q) was tested in the same manner as described in Example 9.

Figure 17:
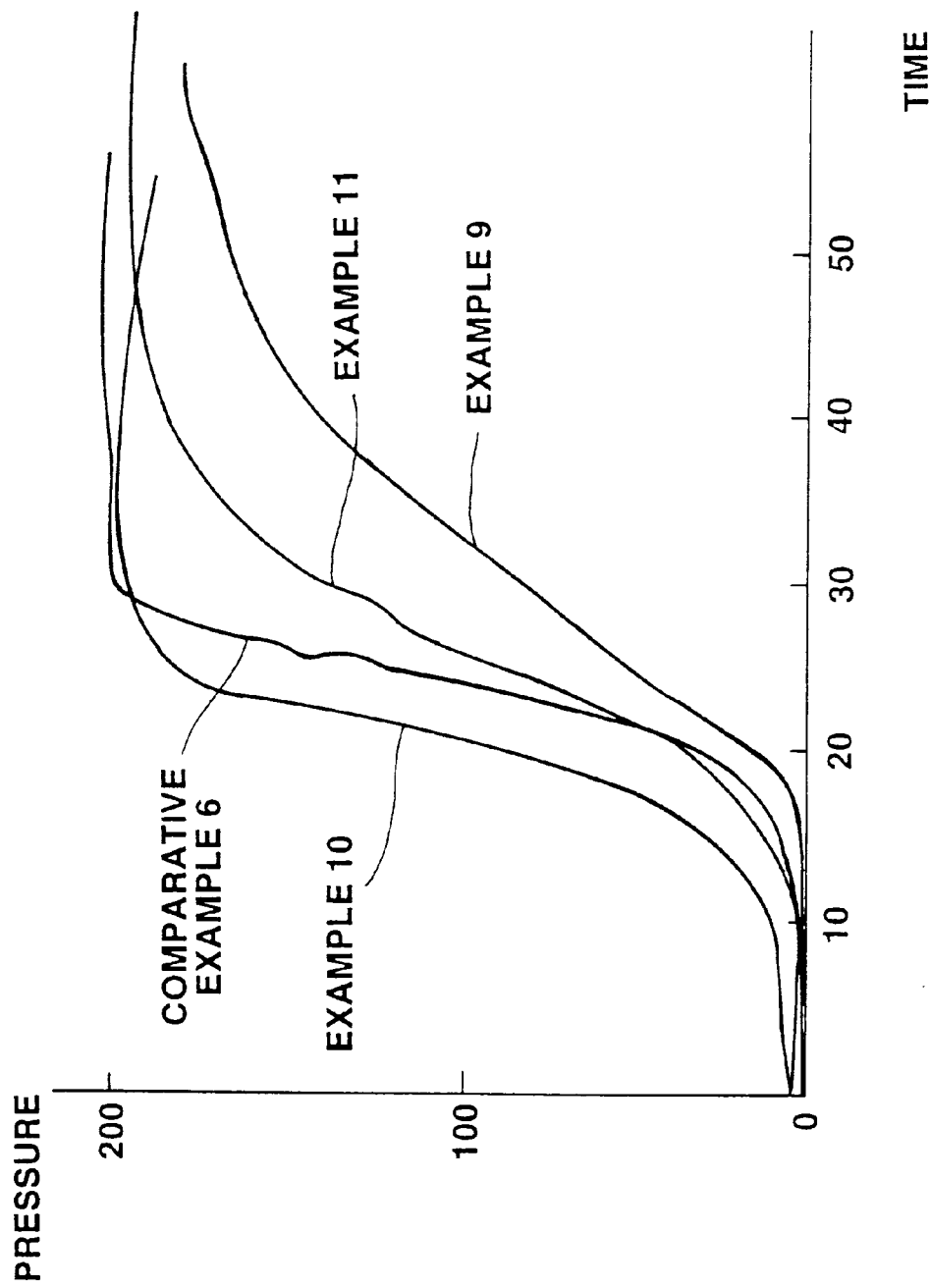
FIG. 17 is a diagram similar to FIG. 12, but showing results of experiments to the airbag inflators (n)–(q) obtained in Examples 9–11 and Comparative Example 6.

The test results of Examples 9 to 11 and Comparative Example 6 are shown in FIG. 17.

In FIG. 17, there is shown pressure change characteristic curves indicating a relationship between generated pressure and elapsed time upon actuation of the initiators of each of the airbag inflators (n) to (q) obtained in Examples 9 to 11 and Comparative Example 6. The airbag inflator (n) of Example 9 exhibited the curve indicating a slow pressure rise in the pressure container. The airbag inflator (o) of Example 10 exhibited the curve indicating a rapid pressure rise in the pressure container. The airbag inflator (p) of Example 11 exhibited the curve indicating a medium pressure rise between the slow pressure rise and the rapid pressure rise. It was confirmed that the pressure rise in the pressure container was readily controllable by varying ignition timings of the initiators within two chambers which were adapted to actuate at different ignition timings. In other words, it was found that flow rate of gas discharged from the inflator housing was easily variable by changing rupture timings of the rupturable walls. Specifically, it was found that the flow rate of gas was adjustable to be reduced for the purpose of slow inflation of the airbag by rupturing one of the divider walls which was adapted to define the flap portions covering a part of the gas outlet ports before the other of the divider walls was ruptured. On the other hand, it was found that the flow rate of gas was adjustable to be increased for the purpose of quick inflation of the airbag by rupturing the one of the divider walls after the other of the divider walls was ruptured. Further, it was found that the flow rate of gas was adjustable to be medium between the reduced and increased flow rates for the purpose of middle inflation of the airbag between the slow and quick inflation by rupturing the divider walls substantially simultaneously.

As be appreciated from the above description, each of the airbag inflators of the first and second embodiments according to the present invention comprises a pressurized gaseous mixture operating the pressure-applying wall to forcibly rupture the divider wall in response to actuation of the initiator. Thus, the rupture is caused by propagation of a pressure increased by ignition of the pressurized gaseous mixture. This leads to quick discharge of the inflation gas into an inflatable airbag, serving for faster inflation of the airbag as compared with the airbag inflators of a conventional heat-conduction type. Further, since the airbag inflator of the invention is provided with a plurality of chambers defined by divider walls, a stepwise inflation of an airbag can be achieved by adjusting rupture strengths of the divider walls. Furthermore, the airbag inflator of the present invention contributes to a wide variety of configuration of a housing thereof and then layout of components within the housing.

Further, as be understood from the above description, since the airbag inflator of the third embodiment according to the invention is provided with a plurality of initiator gas chambers, each initiator gas chamber has a reduced volumetric capacity. This allows characteristics of ignition and combustion propagation of the combustible gases in the chambers to be desirably varied. Further, the airbag inflator of the third embodiment can adjust ignition timings of the initiators within the chambers, serving for using various gas discharge characteristics. In addition, gas discharge from the inflator housing can be controlled slow by blocking at least a part of the gas outlet ports by the integrally hinged flap portions separated from the divider walls upon actuation of the initiators.

What is claimed is:

1. An airbag inflator, comprising:
   a housing having an interior and a gas outlet port open to outside the housing and communicating with the interior;
   divider walls separating at least two chambers from the interior;
   pressurized combustible gaseous mixtures stored in said at least two chambers;
   initiators each adapted to actuate at individual ignition timings and disposed within said at least two chambers, said initiators being actuatable to ignite said pressurized combustible gaseous mixtures to rupture said divider walls; and
   an integrally hinged flap portion forcibly separable from each of said divider walls in response to actuation of said initiators;
   said integrally hinged flap portion cooperating with the gas outlet port to provide a variety of flow rates of the pressurized combustible gaseous mixture flowing through the gas outlet port out of said housing upon the separation of said integrally hinged flap portion.

2. An airbag inflator as claimed in claim 1, wherein said integrally hinged flap portion has a maximum open position in which a minimum flow rate of the pressurized combustible gaseous mixture is permitted.

3. An airbag inflator as claimed in claim 2, wherein when one of said initiators has an earlier ignition timing than each of the remainder of said initiators, said integrally hinged flap portion is in the maximum open position.

4. An airbag inflator as claimed in claim 1, wherein said integrally hinged flap portion has a minimum open position in which an increased flow rate greater than a minimum flow rate of the pressurized combustible gaseous mixture is permitted.

5. An airbag inflator as claimed in claim 4, wherein when one of said initiators has a later ignition timing than each of the remainder of said initiators, said integrally hinged flap portion is in the minimum open position.

6. An airbag inflator as claimed in claim 1, wherein said integrally hinged flap portion has an intermediate open position in which a medium flow rate of the pressurized combustible gaseous mixture smaller than an increased flow rate and greater than a minimum flow rate is permitted.

7. An airbag inflator as claimed in claim 6, wherein when one of said initiators has an ignition timing substantially simultaneous with an ignition timing of each of the remainder of said initiators, said integrally hinged flap portion is in the intermediate open position.

8. An airbag inflator as claimed in claim 1, wherein each of the pressurized combustible gaseous mixtures comprises a combustible gas, an oxygen gas and an inert gas.

9. An airbag inflator as claimed in claim 8, wherein each of the pressurized combustible gaseous mixtures consists of essentially of 15–40% by volume of hydrogen, 12–18% by volume of oxygen and a balance of an inert gas.

10. An airbag inflator as claimed in claim 9, wherein the inert gas is at least one selected from the group consisting of nitrogen, argon and helium.

11. An airbag inflator as claimed in claim 1, wherein each of said initiators includes a spark ignitor.

12. An airbag inflator as claimed in claim 1, wherein each of said initiators includes a nichrome wire electrically heatable.

13. An airbag inflator as claimed in claim 1, wherein said divider walls are rupturable when pressures of not less than a predetermined value are applied thereto, respectively.

14. An airbag inflator as claimed in claim 13, wherein said predetermined value is 400 atm.

15. An airbag inflator as claimed in claim 13, wherein said divider walls are in the form of a disk having a same outer diameter.

16. An airbag inflator as claimed in claim 15, wherein a center of the gas outlet port is disposed outside one of said at least two chambers and spaced apart by a distance of not more than ½ of an outer diameter of one of said divider walls from an outer periphery of said one of the divider walls at which said one of the divider walls is connected with said housing.

17. An airbag inflator as claimed in claim 16, wherein each of said divider walls has a fragile portion easy to rupture.

18. An airbag inflator as claimed in claim 17, wherein said fragile portion has a length which is ½ to 1 time an inner diameter of said housing.

19. An airbag inflator as claimed in claim 18, wherein said fragile portion has a generally cross shape having an intersection which is at a substantially center of said each of the divider walls, and a reduced thickness smaller than the remainder portion of said each of the divider walls.

20. An airbag inflator as claimed in claim 1, wherein said at least two chambers are a pair of chambers opposed to each other via a chamber in which the gas outlet port is formed.

21. An airbag inflator as claimed in claim 20, wherein said divider walls are in the form of a disk identical in configuration and structure to each other.

22. An airbag inflator as claimed in claim 20, wherein the pressurized combustible gaseous mixtures stored in the pair of chambers are identical in composition and pressure to each other.

23. An airbag inflator as claimed in claim 20, wherein said initiators are identical in structure to each other.

24. An airbag inflator as claimed in claim 21, wherein a center of said gas outlet port is spaced apart by a distance of not more than ½ of an outer diameter of one of said divider walls from a periphery of said one of the divider walls at which said one of the divider walls is connected with said housing.

25. An airbag inflator as claimed in claim 24, wherein said divider walls are rupturable when pressures of not less than a predetermined value are applied thereto, respectively.

26. An airbag inflator as claimed in claim 25, wherein said predetermined value is 400 atm.

27. An airbag inflator as claimed in claim 25, wherein each of said divider walls has a fragile portion easy to rupture.

28. An airbag inflator as claimed in claim 27, wherein said fragile portion has a length which is ½ to 1 time an inner diameter of said housing.

29. An airbag inflator as claimed in claim 28, wherein said fragile portion has a generally cross shape having an intersection which is at a substantially center of said each of the divider walls, and a reduced thickness smaller than the remainder portion of each of said divider walls.

* * * * *